April 27, 1926.

H. NATTRASS 1,582,344

COUPLING FOR USE BETWEEN TRUCKS AND THE LIKE

Filed Nov. 19, 1925

Inventor
H. Nattrass
by Langner Perry Card & Langner
Attys.

Patented Apr. 27, 1926.

1,582,344

UNITED STATES PATENT OFFICE.

HOWARD NATTRASS, OF WELLINGTON, NEW ZEALAND.

COUPLING FOR USE BETWEEN TRUCKS AND THE LIKE.

Application filed November 19, 1925. Serial No. 70,151.

*To all whom it may concern:*

Be it known that I, HOWARD NATTRASS, citizen of Dominion of New Zealand, residing at 29 Mulgrave Street, Wellington, New Zealand, have invented certain new and useful Improvements in Couplings for Use Between Trucks and the like, of which the following is a specification.

This invention relates to couplings used between trucks of a string or train thereof employed for carrying heavy loads, and where there is provided throughout the string or train of vehicles, a power shaft in sections, coupled together by universal joints in order that driving power may be applied to the running wheels of the vehicles.

At the present time it is necessary in order to successfully operate a string or train of vehicles fitted with a power shaft as aforesaid to provide a special separate distance bar or rod between each pair of vehicles in order to maintain the latter at proper distances apart, and relieve the sections of power shaft between the vehicles of pulling and pushing strain, so that it will function properly in transmitting driving power to the vehicle wheels.

The present invention has for its object the provision of an improved form of coupling for use between a pair of vehicles, said coupling serving both as a means of maintaining the vehicles at correct distances apart, and also as a means of transmitting driving power from vehicle to vehicle without submitting the driving means to strains other than a driving strain.

The improved device comprises a tubular member provided with hollow part spherical ends adapted to be detachably secured in larger part spherical portions attached to the vehicles, so as to connect the latter, the tubular member acting as a distance bar, with its part spherical ends operating in the larger spherical portions attached to the vehicles in the manner of universal joints.

The section of the power or driving shaft located between the two vehicles thus connected, is accommodated within said tubular member, while the universal joints which connect said section of power or driving shaft with the sections of the power or driving shaft mounted on the connected vehicles are housed and operate in the part spherical ends of the tubular member.

In the accompanying drawings in conjunction with which the invention will be more particularly described:—

Figure 1:
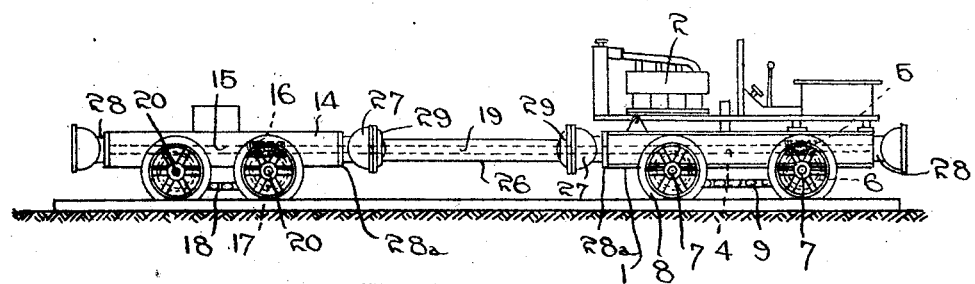
Figure 2:
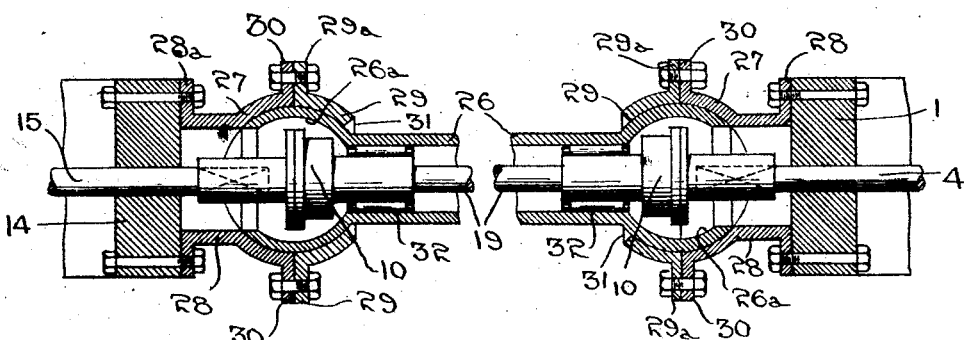

Figure 1 is an elevation showing an engine or power unit, connected to a truck by means of the improved coupling, while, Figure 2 is a longitudinal sectional view (broken) of the coupling.

The engine or power unit, preferably comprises a truck 1, equipped preferably with a petrol driven motor 2, speed gears, brakes, clutch and reverse gear, and also with reduction gear, through which power is transmitted to a shaft 4 mounted lengthways in the truck 1, said shaft 4 having keyed thereon a worm 5 which meshes with a worm wheel 6 keyed on one of the axles 7 of the running wheels 8 of the truck 1, the other of said axles 7 being driven through a chain drive 9 from the worm driven axle 7.

The shaft 4 projects from each end of the truck 1, and is squared or otherwise formed to take one of the sockets of a universal joint 10 the other socket of which is fitted on the end of a section 19 of shaft located between the truck 1, and a truck 14 to be propelled.

The section 19 of shaft is enclosed in a tubular member or housing 26 provided with hollow part spherical ends 26$^a$ adapted to be inserted in larger part spherical portions 27 at the outer ends of hollow fittings 28 provided with flanges 28$^a$ through which, or by other means, said hollow fittings 28 are secured to the trucks 1 and 14 adapted to be coupled together and driven.

The part spherical ends 26$^a$ of the tubular member of housing 26 are retained in the part spherical portions 27 of the hollow fittings 28 attached to the trucks 1 and 14, by means of rings 29 slipped on said tubular member or housing 26, said rings 29 being shaped to embrace or fit the part spherical ends 26$^a$ of the tubular member or housing 26 and being provided with flanges 29$^a$, lugs or the like through which the flanges 30 lugs or the like on the part spherical portions 27 of the hollow fittings 28 attached to the vehicles bolts or screws are passed to secure said part spherical portions 27 and the rings 29, together, and the part spherical ends 26$^a$ within the united portions 27 and 29. By removing the rings 29, the ends 26$^a$ of the tubular member or housing 26 can be withdrawn from the part spherical portions 27.

The openings 31 in the rings 29 are made large enough to allow a pre-determined amount of movement of the tubular member or housing 26 in any direction, as in a universal joint.

The trucks 14 of the train are each provided with a shaft 15, worm 16 thereon, worm wheel 17, and chain drive 18 similar to and acting in a similar manner to the shaft 4, worm 5, worm wheel 6, and chain drive 9 of the truck 1 of the engine or power unit, so that each axle 20 of each truck 14 will also be driven.

The means described serve as a flexible coupling and distance rod between the vehicles and maintain the latter at the desired distance apart.

The enlargements formed by the securing together of the part spherical portions 27 rings 29 and ends 26ª provide housings for the universal joints 10, the ends of the shafts 4 and 15 of the trucks entering the hollow fittings 28 attached thereto to receive sockets of said universal joints 10, while the aforesaid tubular member or housing 26 is provided preferably at each end with roller bearings 32 to reduce friction caused by rotation of the section 19, of the power or driving shaft therein.

The centres of the universal joints 10 and the housings therefor coincide with each other and by the arrangement described the power shaft section 19 between the vehicles or trucks, while free to turn and transmit driving power from one vehicle to the other, is relieved of all end strain by the flexible coupling, consisting of the tubular member 26, and the part spherical portions, ends, rings and hollow fittings.

The section of shaft 19 performs no part in the maintaining of the vehicles at a proper distance apart, the tubular member 26 being provided for this purpose, in order to prevent any pushing or pulling strain being borne by the shafts 4, 19 and 15, thereby leaving the universal joints 10 free to function freely in transmitting driving power to the axles of the running wheels of the train.

Any number of trucks 14 can be connected together in the same manner as the engine or power unit and the truck 14 shown in Figure 1.

The engine or power unit can be used at either end of a train, or between any two trucks 14 thereof, and in each case transmits power from the shaft 4 via sections of shaft 19 and universal joints 10 between the vehicles, to the shafts 15 thereof, the latter in turn transmitting power via further shafts 19 and universal joints 10, to following or preceding trucks 14.

What I do claim and desire to secure by the Letters Patent of the United States is:—

1. A coupling for the purpose set forth, comprising a tubular distance member between a pair of vehicles and attached thereto by universal joints, a section of power shaft housed in said distance member, and drivably connecting through universal joints, sections of power shaft on said vehicles, the centres of the joints of the tubular distance member, coinciding with the centres of the joints of the power shaft, substantially as described.

2. A coupling for the purpose set forth, comprising a section of shaft and universal joints, drivably connecting two shafts of separate vehicles; a tubular distance member enclosing said section of shaft, hollow fittings on said vehicles for receiving the ends of the vehicle shafts, and inter engaging part spherical portions on said tubular member, and said hollow fittings adapted to be secured together, to provide housings for said universal joints, substantially as described.

3. A coupling for the purpose set forth as in claim 2, and wherein the tubular distance member is provided at its ends with part spherical portions adapted to be entered in part spherical portions on fittings secured to a vehicle; and flanged rings on said tubular distance member adapted to be secured to the part spherical portions of said fittings for the purpose of retaining the part spherical portions of the tubular distance member within the part spherical portions of said fittings, substantially as described.

In testimony whereof I have signed my name to this specification.

HOWARD NATTRASS.